Aug. 13, 1957     E. P. D'ANGELO     2,802,672
FOLDABLE GOLF CART
Filed Oct. 20, 1954
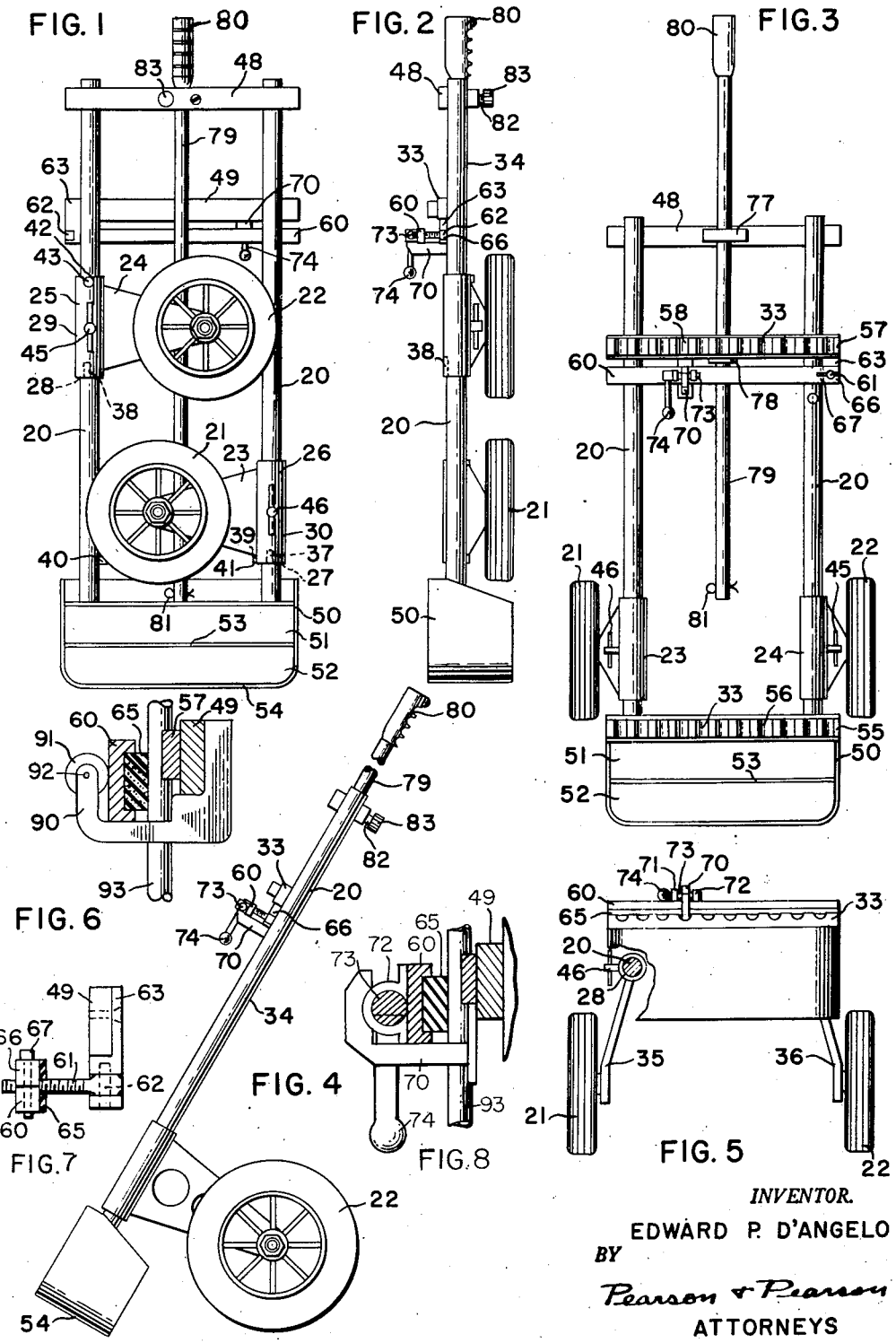
INVENTOR.
EDWARD P. D'ANGELO
BY
Pearson & Pearson
ATTORNEYS

United States Patent Office 2,802,672
Patented Aug. 13, 1957

2,802,672

FOLDABLE GOLF CART

Edward P. D'Angelo, Lawrence, Mass.

Application October 20, 1954, Serial No. 463,474

10 Claims. (Cl. 280—40)

This invention relates to golf club carts of the type having a rigid frame upon which a set of golf clubs may be aligned in a straight row for wheeling about a golf course.

Many such devices have been proposed and are in use, but among the disadvantages of the same are the use of small wheels that do not ride over a rut or, if the wheels are large, the lack of foldability of such large wheels.

An object of this invention is to provide a golf club cart with a pair of wheels that are each large with relation to the size of the frame and yet may be compactly folded to overlie the area of the frame.

Another object of the invention is to provide a lightweight rigid frame having foldable wheels and at least one longitudinally extending side guide upon which a wheel is longitudinally slideable whereby one wheel may be folded inwardly above the other.

A further object of the invention is to provide a lightweight golf cart having a low centre of gravity and widely spaced large diameter wheels, the cart being changeable to a compact, substantially flat rectangular bundle of less height than a set of clubs that may easily be placed in the trunk of an automobile.

Still another object of the invention is to provide a foldable golf cart capable of supporting an aligned set of golf clubs and having a single transversely extending club retaining arm that may be quickly moved to give simultaneous access to all of the clubs.

Still another object of the invention is to provide a novel latching mechanism, a double hinge pivot and a strip of resilient material on a club retaining arm whereby the arm applies yielding pressure on a set of clubs when in latched position but may be moved completely out of the way when in unlatched position.

In the drawings:

Fig. 1 is a rear view of a golf cart constructed in accordance with the invention in folded condition.

Fig. 2 is a side view of the cart shown in Fig. 1.

Fig. 3 is a front view of the device in unfolded condition.

Fig. 4 is a side view of the device shown in Fig. 3.

Fig. 5 is a bottom view of the device shown in Figs. 1-4 with parts broken away.

Fig. 6 is an enlarged fragmentary side view of a modified form of latch member.

Fig. 7 is an enlarged fragmentary side view of the double hinge of the club retaining bar.

Fig. 8 is a view similar to Fig. 6 of the latch hook and retaining bar of the invention.

In the drawing 20 is a frame of light weight rigid material such as tubular or bar aluminum, frame 20 being preferably flat and rectangular in outline. Frame 20 is designed to accommodate a set of golf clubs usually numbering about twelve, the clubs extending longitudinally of the frame and aligned at spaced distances laterally or transversely of the frame 20.

A pair of identical wheels 21 and 22 are provided, each wheel having an overall diameter such as ten inches or more as compared to the preferred width of frame 20 of about thirteen inches and the preferred length of frame 20 of at least twenty-six inches. The diameter of each wheel 21 or 22 is at least equal in length to half the width of the frame. Such relatively large wheels are especially desirable for golf carts to easily ride over rough territory, to raise the frame well above protuberances on the ground, and to offer less resistance when pulling or pushing the cart.

A pair of brackets 23 and 24 are provided, each having a wheel 21 or 22 at its terminal end, on the outside thereof, and each connected at its other end to an intermediate portion of one of the opposite longitudinally extending sides of frame 20. Each bracket 23 or 24 is hinge pivoted to frame 20. The hinge pivot preferably takes the form of a pair of tubular, longitudinally extending side frame members 25 and 26 each of circular cross section and forming part of the frame 20. The brackets 23 and 24 each include a circular bore 27 or 28 in a sleeve portion 29 or 30 and are rotatably and slideably sleeved on one of the members 25 or 26. Thus, at least one bracket and preferably both brackets may pivot around its tubular guide or frame member 25 or 26 and may also slide longitudinally thereof. The side frame members 25 and 26 thus form the sides of the skeletonized frame 20 and also form longitudinally extending pivot pins, rods or guides for the wheel brackets 23 and 24.

As indicated in Fig. 4 the golf clubs are carried on the substantially flat upper surface 33 of frame 20 and the brackets 23 and 24 are arranged to fold inwardly flatwise against, and substantially in parallelism with the undersurface 34 of frame 20. Because of the slideable hinge pivot means of the invention, one wheel such as 21 may be pivoted inwardly to overlie the frame 20 and the other wheel such as 22 may be slid along its guide 25 and then also folded inwardly to overlie the frame 20 with both wheels in a common plane parallel to the plane of the side members of frame 20.

As best shown in Fig. 5 the brackets 23 and 24 are slightly bent inwardly as at 35 and 36 to give a broader base to the cart and still may be folded into substantial parallelism with the side members of the frame 20. Each bracket includes a slot such as 37 or 38 which registers with a stud such as 39 or 40 on the bracket guide to lock the bracket in unfolded position. The bracket which pivots in place, such as bracket 23, includes a second slot 41 for registering with the same stud 39 when in folded position. The bracket which slides before pivoting such as bracket 24 includes a second slot 42 for registering with another stud 43 in folded position. Thus the brackets are held against pivoting or rotating in both folded or unfolded position except when the slots are slid longitudinally off the studs. The brackets are locked against longitudinal sliding by threaded mechanism in the form of a pair of set screws 45 and 46 each threaded in a sleeve 29 or 30 and bearing against a side guide 25 or 26.

Frame 20 preferably includes an upper laterally extending frame member 48, an intermediate laterally extending frame member 49 and a lower laterally extending frame member 50. Frame member 50 is a club head housing divided into an upper compartment 51 for the metal headed clubs and a lower compartment 52 for the wooden headed clubs by a partition 53. It should be noted that the housing is slightly wider than the remainder of the frame and of considerably greater depth whereby the cart may stand upright on the bottom face 54 of the same when in folded position. In unfolded position, the bottom face 54 forms one of the three points of support for the cart, the wheels 21 and 22 forming the other two points and in unfolded position the frame is at an incline. The centre of gravity of the cart is such that it will stand, with or without the clubs, in the inclined position shown in Fig. 4 but may be rolled by merely lifting bottom face 54 off the ground a slight distance. The interior of the compartments 51 and 52 is lined with rubber or the like to prevent damage to the club heads and a club rack 55, having a plurality of spaced recesses 56 is provided to segregate the clubs along an upper edge of the housing.

The intermediate frame piece 49 also includes a club rack 57 having recesses 58 for spacing the clubs and is positioned on frame 20 at a height just below the wrappings on the handles of a set of golf clubs, whereby only the shaft portions are engaged in recesses 56 and 58.

To provide ready access to any desired club and yet to prevent the clubs from falling out of the club racks 55 and 57 a club retaining bar 60 is provided which extends transversely of frame 20 in the space between club racks 55 and 57. The retaining bar, or arm, 60 is preferably double hinge pivoted at one end to one side of frame 20. As shown, the bar 60 is pivotable in one plane on a hinge pin 61 and hinge pin 61 is pivotable in a plane at right angles thereto on a pivot pin 62 which extends longitudinally of frame 20 on a frame piece 63. Thus the bar 60 may be pivoted away from the club racks in a plurality of directions. Preferably a strip of resilient material 65, such as foam rubber, is affixed to the under surface of bar 60 to cushion the engagement of the same with the clubs and also to provide a yieldable pressure thereon. Preferably also the end 66 of bar 60 is split and threaded on hinge pin 61 there being a set screw 67 to tighten the split end 66 at a desired position along pin 61.

A latch hook 70 is provided intermediate the ends of the intermediate frame piece 49 and depends therebelow, the hook 70 receiving the bar 60. The bar 60 includes a pair of ears 71 and 72 each journalled to receive an eccentric cylindrical cam 73 rotatable by a handle 74. Thus the arm 60 may be placed in hook 70 and as the handle 74 is turned, the cam 73 exerts mechanical leverage to tightly press the arm 60 and strip 65 against the clubs and the clubs into the racks 55 and 57. The bar 60 is thus supported at a spaced distance from, and substantially in parallelism with, the upper surface 33 of frame 20 when in locked position by the hinge pin 61 and the latch hook 70. The retaining bar 60 may be lifted out of hook 70 and then swung outwardly away from the racks to free all clubs for use.

The upper transverse frame piece 48 includes a sleeve bracket 77 on its upper face and the intermediate frame piece 49 includes a sleeve bracket 78 on its lower face for slideably receiving a straight cart handle 79. Handle 79 is of rigid, light weight material terminating in a handle bar grip 80 and the brackets 77 and 78 are centrally disposed of the width of frame 20. As shown, handle 79 is nearly as long as the frame 20 itself and slides from the position shown in Figs. 1 and 2 to an extended position wherein the cotter pin 81 strikes bracket 78. Bracket 77 is split and provided with a set screw 82 and turning knob 83 whereby handle 79 may be tightened in any desired longitudinal position.

It should be noted that the inward bends 35 and 36 in brackets 23 and 24 accommodate the handle 79 when in folded position, thus making a more compact folded package or bundle.

In Fig. 6 a modification is shown wherein a latch hook 90, similar to latch hook 70 depends from an intermediate portion of an intermediate frame piece 49. A freely revoluble roller 91 is journalled in the hook 90, at 92, and a bar 60 having a resilient strip 65 engages the roller tangentially as it slides downwardly into locked position against the club shafts such as 93.

I claim:

1. A collapsible golf club cart comprising a rectangular frame having an upper, lateral frame member, a lower lateral frame member forming a compartment adapted to enclose the heads of a set of laterally aligned golf clubs, and two spaced apart parallel side frame members of circular cross section extending longitudinally from said upper frame member to said lower frame member; a pair of wheels, each of a diameter at least equal to half the distance between said parallel side members; a pair of brackets each having a circular bore at the base thereof rotatably and slideably sleeved on one of said parallel side members of said frame, each having an inward bend intermediate thereof and each having one of said wheels journalled on the outside of the terminal end thereof; means for positioning said brackets relative to said side members and a straight handle slideably mounted centrally of said upper frame member to move from a position along the longitudinal centre line of said frame to a position in upward extension thereof, said brackets and wheels being foldable from a frame supporting position with said wheels normal to the plane of the side and upper members to a substantially flatwise position one beside the other with both of said wheels in a common plane parallel to the plane of the side and top frame members and with both of said brackets having the inward bends thereof overlying said handle member.

2. A combination as specified in claim 1 wherein said lower lateral frame member includes a flat bottom face of substantial depth adapted to support said frame in vertical position thereabove when said wheels are in folded or unfolded position.

3. A combination as specified in claim 1 wherein said lower lateral frame member includes a laterally extending partition intermediate of the height thereof adapted to support the heads of some clubs on a higher plane than the heads of other clubs located below said partition.

4. A combination as specified in claim 1 wherein the means for positioning said brackets relative to said side frame members comprises set screws located on the outside of said brackets and operable against said side frame members for preventing longitudinal displacement of said brackets.

5. A combination as specified in claim 1 plus a pair of longitudinally spaced apart, laterally extending club racks on said frame, each having a plurality of spaced recesses for receiving a set of laterally aligned golf clubs, the upper club rack supporting a sleeve bracket for slideably receiving said handle and the lower club rack being mounted along the upper edge of said lower lateral frame member.

6. A combination as specified in claim 5 plus a laterally extending club retaining bar of rigid material, located between said upper and lower club racks proximate the upper rack and means for supporting said bar at a spaced distance from, and substantially in parallelism with, the plane of said side frame members for cooperatively clamping a set of golf clubs into the recesses of said racks.

7. A combination as specified in claim 6 wherein said supporting means for said bar includes double pivot means connecting one end of said bar to a side of said frame for permitting said bar to pivot in planes at right angles to each other.

8. A combination as specified in claim 6 wherein the supporting means for said bar includes cam type latch means operable by a handle for pressing said bar toward said frame with mechanical leverage.

9. A combination as specified in claim 6 wherein the supporting means for said bar includes a hinge pivotable in two planes at one end of said bar, adapted to swingably support the same on said frame, and a latch hook having a freely revoluble, bar engaging roller intermediate of said bar, adapted to urge said bar toward said frame.

10. A combination as specified in claim 6 wherein the supporting means for said bar includes a hinge pivot at one end thereof, a latch hook proximate the other end thereof and a strip of resilient material coextensive with, and fixed to the undersurface of said bar for engaging a set of clubs on said frame with a yieldable, variable pressure.

References Cited in the file of this patent

UNITED STATES PATENTS

| | | |
|---|---|---|
| 2,452,929 | Holcomb | Nov. 2, 1948 |
| 2,533,541 | Warring | Dec. 12, 1950 |
| 2,599,354 | Stableford | June 2, 1952 |
| 2,662,776 | Hurst | Dec. 15, 1953 |

FOREIGN PATENTS

| | | |
|---|---|---|
| 829,858 | Germany | Jan. 31, 1952 |